(12) United States Patent
Li et al.

(10) Patent No.: US 11,527,098 B2
(45) Date of Patent: Dec. 13, 2022

(54) DISPLAYING BASE PLATE AND FABRICATING METHOD THEREOF, AND DISPLAYING DEVICE

(71) Applicant: BOE Technology Group Co., Ltd., Beijing (CN)

(72) Inventors: Dong Li, Beijing (CN); Hao Liu, Beijing (CN); Huijuan Zhang, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/347,970

(22) Filed: Jun. 15, 2021

(65) Prior Publication Data

US 2022/0121835 A1    Apr. 21, 2022

(30) Foreign Application Priority Data

Oct. 20, 2020 (CN) .......................... 202011128920.3

(51) Int. Cl.
  *G06V 40/13*   (2022.01)
  *G06F 3/041*   (2006.01)

(52) U.S. Cl.
  CPC ........ *G06V 40/1318* (2022.01); *G06F 3/0412* (2013.01); *G06V 40/1324* (2022.01)

(58) Field of Classification Search
  None
  See application file for complete search history.

(56) References Cited

U.S. PATENT DOCUMENTS

2021/0020710 A1* 1/2021 Park ................... H01L 27/3234
2021/0334502 A1* 10/2021 Lee ..................... G06V 40/1318

\* cited by examiner

*Primary Examiner* — Joseph R Haley
(74) *Attorney, Agent, or Firm* — WHDA, LLP

(57) ABSTRACT

A displaying base plate and a fabricating method thereof, and a displaying device. The displaying base plate includes: a substrate, and a plurality of displaying units and a plurality of fingerprint identifying units that are located on the substrate; each of the displaying units includes at least one sub-pixel; orthographic projections of the fingerprint identifying units on the substrate are separated from orthographic projections of the displaying units on the substrate; and each of the fingerprint identifying units includes a first electrode and a shielding trace that are insulated from each other, an orthographic projection of the shielding trace on the substrate surrounds at least part of an orthographic projection of the first electrode on the substrate, and the shielding trace is electrically connected to an earthed end of the displaying base plate.

19 Claims, 3 Drawing Sheets

DISPLAYING BASE PLATE AND FABRICATING METHOD THEREOF, AND DISPLAYING DEVICE

CROSS REFERENCE TO RELEVANT APPLICATIONS

The present disclosure claims the priority of the Chinese patent application filed on Oct. 20, 2020 before the Chinese Patent Office with the application number of 202011128920.3 and the title of "DISPLAYING BASE PLATE AND FABRICATING METHOD THEREOF, AND DISPLAYING DEVICE", which is incorporated herein in its entirety by reference.

TECHNICAL FIELD

The present disclosure relates to the technical field of displaying, and particularly relates to a displaying base plate and a fabricating method thereof, and a displaying device.

BACKGROUND

Currently, most of tablet displaying devices (for example, a mobile phone) realizes the functions such as startup unlocking, identity authentication and consumption payment by using the technique of fingerprint identification. The mainstream technique of fingerprint identification is to paste an independent fingerprint identification sensor to the non-displaying region on the back or front face of the screen.

SUMMARY

The embodiments of the present disclosure provide a displaying base plate and a fabricating method thereof, and a displaying device.

The embodiments of the present disclosure employ the following technical solutions:

In an aspect, there is provided a displaying base plate, wherein the displaying base plate comprises:

a substrate;

a plurality of displaying units, wherein the plurality of displaying units are located on the substrate, and each of the displaying units comprises at least one sub-pixel;

a plurality of fingerprint identifying units, wherein the plurality of fingerprint identifying units are located on the substrate, and orthographic projections of the fingerprint identifying units on the substrate are separated from orthographic projections of the displaying units on the substrate; and each of the fingerprint identifying units comprises a first electrode and a shielding trace that are insulated from each other, an orthographic projection of the shielding trace on the substrate surrounds at least part of an orthographic projection of the first electrode on the substrate, and the shielding trace is electrically connected to an earthed end of the displaying base plate.

Optionally, the displaying base plate further comprises a pixel defining layer located on the substrate, and the pixel defining layer comprises a plurality of first openings and a plurality of second openings; and in each of the fingerprint identifying units, the first electrode is located within one of the first openings, an orthographic projection of the first electrode on the substrate is located within an orthographic projection of the first opening on the substrate, the shielding trace is located on one side of the pixel defining layer that is further away from the substrate, and the first electrode and the shielding trace are not connected to each other.

Optionally, the shielding trace covers at least part of a side wall of the first opening, and the shielding trace covers at least a surface of the pixel defining layer that is further away from the substrate.

Optionally, the sub-pixel comprises a second electrode, the second electrode is located on one side of the pixel defining layer that is closer to the substrate, and an orthographic projection of the second opening on the substrate is located within an orthographic projection of the second electrode on the substrate; and the first electrode and the second electrode are provided in a same one layer.

Optionally, a distance between the first electrode and a side wall of the first opening ranges from approximately 1 µm to approximately 3 µm.

Optionally, the sub-pixel further comprises a third electrode, and the third electrode is located on one side of the pixel defining layer that is further away from the substrate, and covers the second opening; and the shielding trace and the third electrode are provided in a same one layer, and are insulated from each other.

Optionally, the shielding trace and an anode are provided in a same one layer.

Optionally, the third electrode is an anode, and the second electrode is a cathode; or, the third electrode is a cathode, and the second electrode is an anode.

Optionally, the sub-pixel further comprises an organic light emitting functional layer, and the second electrode, the third electrode and the organic light emitting functional layer form a light emitting unit.

Optionally, the displaying units and the fingerprint identifying units are arranged in a stagger form in a first direction and a second direction, wherein the first direction and the second direction intersect perpendicularly; and all of the shielding traces of the fingerprint identifying units that are arranged in a first diagonal-line direction are connected to each other, and all of the third electrodes of the displaying units that are arranged in the first diagonal-line direction are connected to each other, wherein the first diagonal-line direction and the first direction intersect non-perpendicularly.

Optionally, the shielding traces of the fingerprint identifying units that are arranged in a second diagonal-line direction are not connected to each other, and the third electrodes of the displaying units that are arranged in the second diagonal-line direction are not connected to each other, wherein the second diagonal-line direction intersects with the first diagonal-line direction, and non-perpendicularly intersects with the first direction.

Optionally, the fingerprint identifying unit further comprises a fourth electrode and an insulating layer; and the fourth electrode is provided on one side of the first electrode that is further away from the substrate, an orthographic projection of the fourth electrode on the substrate is located within an orthographic projection of the first opening on the substrate, the fourth electrode and the shielding trace are insulated from each other, and the insulating layer is located between the fourth electrode and the first electrode.

Optionally, the displaying base plate further comprises a packaging layer, the fingerprint identifying unit further comprises a first thin-film transistor, and the sub-pixel further comprises a second thin-film transistor; and the first thin-film transistor is located on one side of the first electrode that is closer to the substrate, and is electrically connected to the first electrode, the second thin-film transistor is located on one side of the second electrode that is closer to the substrate, and is electrically connected to the second electrode, and the packaging layer covers the third electrode, the shielding trace and the first electrode.

Optionally, each of the first thin-film transistor and the second thin-film transistor comprises an active layer, a grid insulating layer, a grid, an inter-layer-medium layer, a source and a drain all of which are provided sequentially in stack on the substrate, and the displaying base plate further comprises a buffer layer;

the active layer of the first thin-film transistor and the active layer of the second thin-film transistor are provided in a same one layer, the grid of the first thin-film transistor and the grid of the second thin-film transistor are provided in a same one layer, and the source and the drain of the first thin-film transistor and the source and the drain of the second thin-film transistor are provided in a same one layer; and the buffer layer is located between the active layer and the substrate.

Optionally, the fingerprint identifying unit further comprises a first flat part, the first flat part covers the first thin-film transistor, and the first electrode is electrically connected to the first thin-film transistor by a via hole of the first flat part.

Optionally, the sub-pixel further comprises a second flat part, the second flat part covers the second thin-film transistor, and the second electrode is electrically connected to the second thin-film transistor by a via hole of the second flat part; and the first flat part and the second flat part are provided in a same one layer.

Optionally, each of the displaying units comprises three or four sub-pixels having different luminous colors.

In another aspect, there is provided a displaying device, wherein the displaying device comprises the displaying base plate stated above.

In yet another aspect, there is provided a fabricating method of the displaying base plate, wherein the method comprises:

providing the substrate; and forming the plurality of displaying units and the plurality of fingerprint identifying units on the substrate.

Optionally, after the step of providing the substrate, the method further comprises:

forming a buffer layer on the substrate; and the step of forming the plurality of displaying units and the plurality of fingerprint identifying units on the substrate comprises:

forming sequentially an active layer, a grid insulating layer, a grid metal layer, an inter-layer-medium layer and a source-drain metal layer on the buffer layer, to form a plurality of first thin-film transistors and a plurality of second thin-film transistors, wherein the grid metal layer comprises a plurality of grids, and the source-drain metal layer comprises a plurality of sources and a plurality of drains;

forming a flat layer covering the source-drain metal layer, wherein the flat layer comprises a plurality of first flat parts and a plurality of second flat parts;

forming the plurality of first electrodes and a plurality of second electrodes on the flat layer, wherein the first electrodes are electrically connected to the sources of the first thin-film transistors by via holes penetrating the first flat parts, and the second electrodes are electrically connected to the sources of the second thin-film transistors by via holes penetrating the second flat parts;

forming a pixel defining layer, wherein the pixel defining layer comprises a plurality of first openings and a plurality of second openings;

forming an organic light emitting functional layer covering the second openings;

forming an insulating layer and fourth electrodes;

forming a plurality of third electrodes and the plurality of shielding traces; and forming a packaging layer, wherein the packaging layer covers the third electrodes, the shielding traces, the fourth electrodes and the first electrodes.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

DETAILED DESCRIPTION

Figure 1:
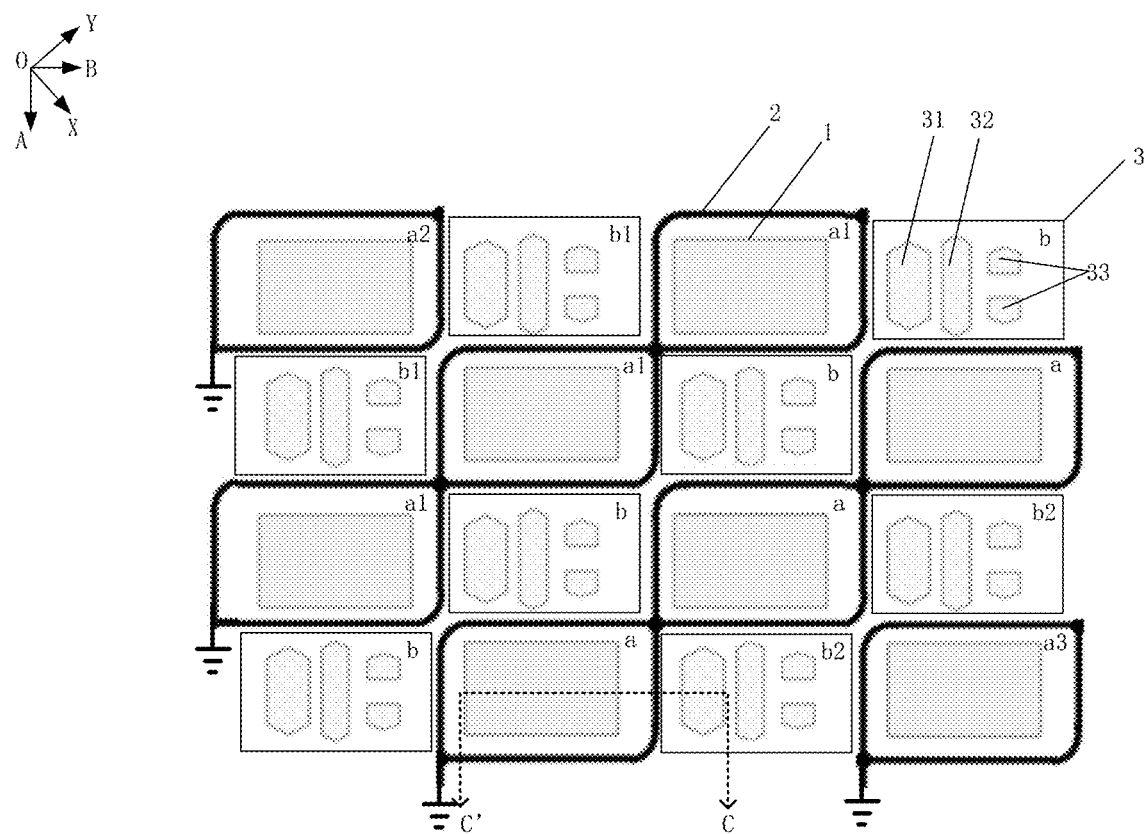
FIG. 1 is a schematic structural diagram of the displaying base plate according to an embodiment of the present disclosure.

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In the embodiments of the present disclosure, terms such as "first", "second", "third" and "fourth" are used to distinguish identical items or similar items that have substantially the same functions and effects, merely in order to clearly describe the technical solutions of the embodiments of the present disclosure, and should not be construed as indicating or implying the degrees of importance or implicitly indicating the quantity of the specified technical features.

In the embodiments of the present disclosure, the meaning of "plurality of" is "two or more", and the meaning of "at least one" is "one or more", unless explicitly and clearly defined otherwise.

In the embodiments of the present disclosure, the terms that indicate orientation or position relations, such as "upper" and "lower", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

An embodiment of the present disclosure provides a displaying base plate, wherein the displaying base plate comprises: a substrate, and a plurality of displaying units and a plurality of fingerprint identifying units that are located on the substrate; each of the displaying units comprises at least one sub-pixel; and orthographic projections of the fingerprint identifying units on the substrate are separated from orthographic projections of the displaying units on the substrate. Referring to FIG. 1, each of the fingerprint identifying units comprises a first electrode 1 and a shielding trace 2 that are insulated from each other, the orthographic projection of the shielding trace 2 on the substrate surrounds at least part of the orthographic projection of the first electrode 1 on the substrate, and the shielding trace is electrically connected to an earthed end of the displaying base plate.

The orthographic projection of the fingerprint identifying unit on the substrate refers to the projection of the fingerprint identifying unit on the substrate in the direction perpendicular to the substrate. In addition, the meanings of the orthographic projections on the substrate of the displaying units, the shielding trace and the first electrode are similar to that, and are not discussed herein further.

The mode of the arrangement of the plurality of displaying units is not limited herein. As an example, the plurality of displaying units may be arranged in an array. The mode of the arrangement of the plurality of fingerprint identifying units is not limited herein. As an example, the fingerprint identifying units are provided between any two neighboring displaying units, or the fingerprint identifying units are provided between some of two neighboring displaying units. FIG. 1 illustrates by taking the case as an example in which the plurality of displaying units are arranged in an array and any two neighboring displaying units have one fingerprint identifying unit provided therebetween.

The sub-pixel may be any one of a red-color sub-pixel, a green-color sub-pixel and a blue-color sub-pixel. The displaying unit may comprise all of the red-color sub-pixel, the green-color sub-pixel and the blue-color sub-pixel. Certainly, the displaying unit may also comprise merely one type of sub-pixel. For example, the displaying unit comprises merely a plurality of red-color sub-pixels, or comprises merely a plurality of green-color sub-pixels, or comprises merely a plurality of blue-color sub-pixels. That may be particularly determined according to practical demands.

The fingerprint identifying units employ the technique of capacitance-type fingerprint identification. The technique of capacitance-type fingerprint identification, by comparing to obtain the difference in the capacitances of the "troughs" and the "peaks" of the fingerprint, realizes fingerprint imaging, and performs the fingerprint identification. In the related art, the technique of ultrasonic fingerprint identification has a high cost and a complicated process, and the technique of optical fingerprint identification is complicated, and has a stray light that affects the clarity of the fingerprint imaging. As compared with those two techniques, the technique of capacitance-type fingerprint identification has a simpler process, a lower cost and more extensive application.

That an orthographic projection of the shielding trace on the substrate surrounds at least part of an orthographic projection of the first electrode on the substrate refers to that the orthographic projection of the shielding trace on the substrate surrounds part of the orthographic projection of the first electrode on the substrate, or, the orthographic projection of the shielding trace on the substrate surrounds the whole orthographic projection of the first electrode on the substrate. FIG. 1 illustrates by taking the case as an example in which the orthographic projection 2 of the shielding trace on the substrate surrounds the whole orthographic projection of the first electrode 1 on the substrate.

The embodiments of the present disclosure provide a displaying base plate and a fabricating method thereof, and a displaying device, wherein the displaying base plate comprises: a substrate, and a plurality of displaying units and a plurality of fingerprint identifying units that are located on the substrate; each of the displaying units comprises at least one sub-pixel; orthographic projections of the fingerprint identifying units on the substrate are separated from orthographic projections of the displaying units on the substrate; and each of the fingerprint identifying units comprises a first electrode and a shielding trace that are insulated from each other, an orthographic projection of the shielding trace on the substrate surrounds at least part of an orthographic projection of the first electrode on the substrate, and the shielding trace is electrically connected to an earthed end of the displaying base plate. Accordingly, in an aspect, the fingerprint identifying units and the displaying units are integrated together, which can realize full-screen fingerprint identification. In another aspect, the orthographic projection of the shielding trace of the fingerprint identifying unit on the substrate surrounds at least part of the orthographic projection of the first electrode on the substrate, and the shielding trace is electrically connected to an earthed end of the displaying base plate. Therefore, the shielding traces can draw out the interference signal between the first electrodes in the neighboring fingerprint identifying units, which effectively reduces the mutual-capacitance interference between the first electrodes in the neighboring fingerprint identifying units, and in turn increases the accuracy of the fingerprint detection. Moreover, the displaying units and the fingerprint identifying units can be shielded, which alleviates the problem of the signal interference between the displaying units and the fingerprint identifying units, to further improve the displaying quality.

Figure 2:
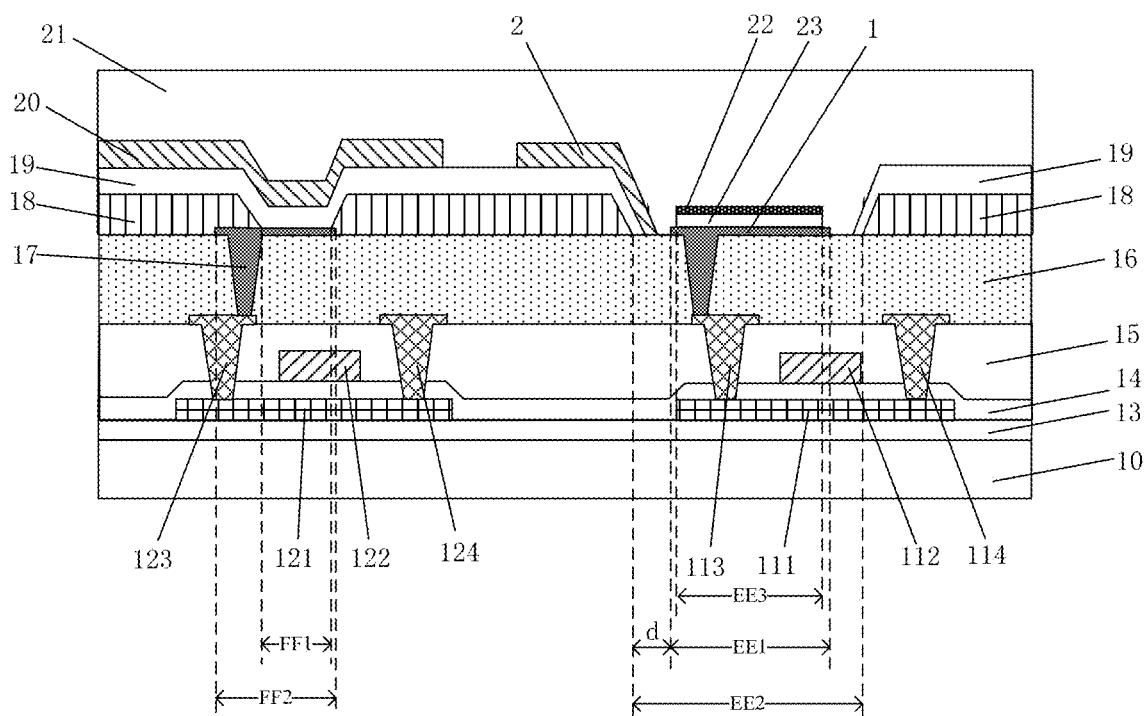
FIG. 2 is a cross-sectional view along the CC' in FIG. 1.

Optionally, in order to simplify the structure and reduce the fabrication cost, referring to FIG. 2, the displaying base plate further comprises a substrate 10 and a pixel defining layer 18 located on the substrate 10, and the pixel defining layer comprises a plurality of first openings (not shown in FIG. 2) and a plurality of second openings (not shown in FIG. 2).

Referring to FIG. 2, in the fingerprint identifying unit, the first electrode 1 is located within one of the first openings, and the orthographic projection EE1 of the first electrode 1 on the substrate 10 is located within the orthographic projection EE2 of the first opening on the substrate; and the shielding trace 2 is located on one side of the pixel defining layer 18 that is further away from the substrate 10, and the first electrode 1 and the shielding trace 2 are not connected to each other. The orthographic projection of the first electrode on the substrate refers to the projection of the first electrode on the substrate in the direction perpendicular to the substrate. The meanings of the orthographic projections on the substrate of the other structures are similar to that, and will not be explained below.

Optionally, the shielding trace covers at least part of a side wall of the first opening, and the shielding trace covers at least a surface of the pixel defining layer that is further away from the substrate.

That the shielding trace covers at least part of a side wall of the first opening refers to that the shielding trace covers part of the side wall of the first opening, and, because the first electrode is located within one of the first openings, at this point, the shielding trace surrounds part of the first electrode; or, the shielding trace covers the whole of the side wall of the first opening, and, because the first electrode is located within the first opening, at this point, the shielding trace surrounds the whole of the first electrode. Moreover, the first opening is located in the pixel defining layer, the side wall of the first opening is the other surface adjacent to the surface of the pixel defining layer that is further away from the substrate, and that the shielding trace covers at least a surface of the pixel defining layer that is further away from the substrate refers to that the shielding trace covers the surface of the pixel defining layer that is further away from the substrate, or, the shielding trace covers the surface of the pixel defining layer that is further away from the substrate, and the shielding trace covers part or whole of the side wall of the first opening in the pixel defining layer.

It should be noted that the first opening may comprise opposite top end and bottom end, wherein the top end, as compared with the bottom end, is further away from the substrate. Referring to FIG. 2, the orthographic projection of the first opening on the substrate refers to the orthographic projection EE2 of the bottom end of the first opening on the substrate. In addition, the position relation between the orthographic projection of the top end of the first opening on the substrate and the orthographic projection of the first electrode on the substrate is not limited, and should be determined according to the shape of the first opening. As an example, referring to FIG. 2, if the shape of the cross section of the first opening in the direction perpendicular to the substrate is an inverted trapezoid, then the orthographic projection of the bottom end of the first opening on the substrate is located within the orthographic projection of the top end of the first opening on the substrate. In this case, the orthographic projection of the first electrode on the substrate is located within the orthographic projection of the top end of the first opening on the substrate. Certainly, if the orthographic projection of the top end of the first opening on the substrate is located within the orthographic projection of the bottom end of the first opening on the substrate, then the orthographic projection of the first electrode on the substrate and the orthographic projection of the top end of the first opening on the substrate do not overlap or at least partially overlap.

The first electrode and the shielding trace are not connected to each other, to prevent short circuit therebetween, which affects the effect of the detection.

Referring to FIG. 2, the sub-pixel comprises a second electrode 17, and the second electrode 17 is located on one side of the pixel defining layer 18 that is closer to the substrate 10. The orthographic projection FF1 of the second opening on the substrate is located within the orthographic projection FF2 of the second electrode 17 on the substrate 10. The first electrode 1 and the second electrode 17 are provided in the same one layer. It should be noted that the structures provided in the same one layer are illustrated by using the same hatch pattern in FIG. 2.

It should be noted that the second opening may comprise opposite top end and bottom end, wherein the top end, as compared with the bottom end, is further away from the substrate. Referring to FIG. 2, the orthographic projection of the second opening on the substrate refers to the orthographic projection FF1 of the bottom end of the second opening on the substrate. In addition, the position relation between the orthographic projection of the top end of the second opening on the substrate and the orthographic projection of the second electrode on the substrate is not limited, and should be determined according to the shape of the second opening. As an example, referring to FIG. 2, if the shape of the cross section of the second opening in the direction perpendicular to the substrate is an inverted trapezoid, then the orthographic projection of the bottom end of the second opening on the substrate is located within the orthographic projection of the top end of the second opening on the substrate. In this case, the orthographic projection of the second electrode on the substrate and the orthographic projection of the top end of the second opening on the substrate partially overlap.

The second electrode may be an anode, and may also be a cathode, which is not limited herein.

That the first electrode and the second electrode are provided in a same one layer refers to that they are fabricated by using a one-step patterning process. The one-step patterning process refers to a process in which the required layer structures are formed by film formation and lithography in one step. The one-step patterning process includes the processes of film formation, exposure, development, etching, stripping and so on.

In order to prevent the contact between the shielding trace and the first electrode, to prevent short circuit therebetween, the first electrode and the side wall of the first opening are required to maintain a certain distance therebetween. If the distance is too large, the aperture ratio is affected. If the distance is too small, that cannot prevent short circuit. Optionally, a distance between the first electrode and a side wall of the first opening ranges from approximately 1 μm to approximately 3 μm. The range of the "approximately" may, for example, be ±0.1 μm, ±0.2 μm and so on herein. For example, approximately 1 μm may be 0.9 μm or 1.1 μm, or may be 0.8 μm or 1.2 μm and so on, and approximately 3 μm may be 2.8 μm, 2.9 μm, 3.1 μm or 3.2 μm and so on. As an example, referring to FIG. 2, the distance d between the first electrode 1 and the side wall of the first opening may be 0.8 μm, 1 μm, 1.5 μm, 2 μm, 2.6 μm, 3 μm, 3.2 μm and so on.

Figure 3:
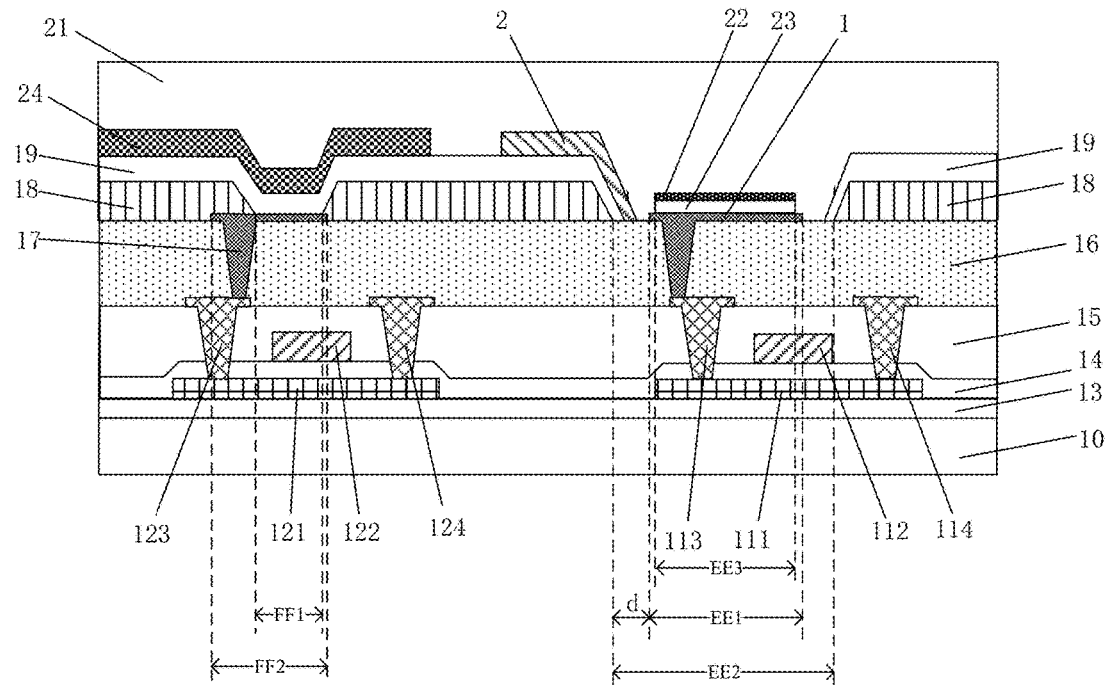
FIG. 3 is a cross-sectional view of the displaying base plate according to an embodiment of the present disclosure.

Optionally, in order to reduce the time quantities of the patterning process and reduce the fabrication cost, referring to FIG. 2, the sub-pixel further comprises a third electrode 20, and the third electrode 20 is located on one side of the pixel defining layer 18 that is further away from the substrate 10, and covers the second opening; and the shielding trace 2 and the third electrode 20 are provided in the same one layer, and are insulated from each other. Moreover, the shielding trace 2 may also be provided in the same one layer as that of the anode 24, as shown in FIG. 3.

The third electrode may be an anode, and, in this case, the second electrode may be a cathode. Alternatively, the third electrode may also be a cathode, and, in this case, the second electrode may be an anode, which is not limited herein.

Referring to FIG. 2, the sub-pixel may further comprise an organic light emitting functional layer 19 located between the second electrode 17 and the third electrode 20, the second electrode, the third electrode and the organic light emitting functional layer may form a light emitting unit, and the organic light emitting functional layer may comprise an electron transporting layer, a luminescent layer, a hole transporting layer and so on. It should be noted that, after the organic light emitting functional layer within the first opening has been removed, referring to FIG. 2, part of the organic light emitting functional layer 19 might remain on the inner wall of the first opening, and the residual part may be removed again, and may also be kept, which is not limited herein.

That the shielding trace and the third electrode are provided in a same one layer refers to that they are fabricated by using a one-step patterning process. The meaning of the one-step patterning process may refer to the above description, and is not discussed herein further. In addition, the position relation between the shielding trace and the third electrode is not limited. As an example, referring to FIG. 2, the shielding trace 2 and the third electrode 20 may not be connected to each other, and an insulating material may be provided between them to ensure the mutual insulation.

Optionally, in order to simplify the designing and reduce the difficulty in the fabrication, referring to FIG. 1, the displaying units and the fingerprint identifying units are arranged in a stagger form in a first direction and a second direction, wherein the first direction and the second direction intersect perpendicularly.

Referring to FIG. 1, all of the shielding traces of the fingerprint identifying units that are arranged in a first diagonal-line direction (the direction OY in FIG. 1) are connected to each other, and all of the third electrodes of the displaying units that are arranged in the first diagonal-line direction are connected to each other, wherein the first diagonal-line direction (the direction OY in FIG. 1) and the first direction (the direction OB in FIG. 1) intersect non-perpendicularly.

The displaying base plate is usually configured to be rectangular. Therefore, the first direction may be the direction OB shown in FIG. 1 (i.e., the direction of the longer sides of the touch-controlling base plate), and, in this case, the second direction may be the direction OA shown in FIG. 1 (i.e., the direction of the shorter sides of the displaying base plate). Alternatively, the first direction may also be the direction OA shown in FIG. 1 (i.e., the direction of the shorter sides of the displaying base plate), and, in this case, the second direction may be the direction OB shown in FIG. 1 (i.e., the direction of the longer sides of the touch-controlling base plate), which is not limited herein. FIG. 1 illustrates by taking the case as an example in which the first direction is the direction OB and the second direction is the direction OA.

The included angle between the first diagonal-line direction and the first direction is not limited. As an example, the included angle may be 40°, 45°, 50°, 60° and so on. It should be noted that, as the first direction and the second direction intersect perpendicularly, and the first diagonal-line direction and the first direction intersect non-perpendicularly, then the first diagonal-line direction and the second direction intersect non-perpendicularly. FIG. 1 illustrates by taking the case as an example in which the direction OY is the first diagonal-line direction.

Referring to FIG. 1, FIG. 1 illustrates by taking the case of one line of the fingerprint identifying units that are arranged in the direction OY and marked with a as an example. In the line, the shielding traces of all of the fingerprint identifying units are connected to each other. Moreover, FIG. 1 illustrates by taking the case of one line of the displaying units that are arranged in the direction OY and marked with b as an example. In the line, the third electrodes of all of the displaying units are connected to each other (not shown in FIG. 1). FIG. 1 illustrates by taking the case as an example in which the displaying base plate comprises 4 rows and 4 columns of the displaying units and the fingerprint identifying units that are arranged in a stagger form.

Optionally, in order to further reduce the difficulty in the layout designing, the shielding traces of the fingerprint identifying units that are arranged in a second diagonal-line direction are not connected to each other, and the third electrodes of the displaying units that are arranged in the second diagonal-line direction are not connected to each other, wherein the second diagonal-line direction intersects with the first diagonal-line direction, and non-perpendicularly intersects with the first direction.

The included angle between the second diagonal-line direction and the first diagonal-line direction is not limited. As an example, the included angle may be 40°, 45°, 50°, 60° and so on. It should be noted that, as the first direction and the second direction intersect perpendicularly, the first diagonal-line direction and the first direction intersect non-perpendicularly, and the second diagonal-line direction and the first diagonal-line direction intersect, then the second diagonal-line direction and the second direction intersect non-perpendicularly. FIG. 1 illustrates by taking the case as an example in which the direction OX is the second diagonal-line direction.

Referring to FIG. 1, FIG. 1 illustrates by taking the case of one line of the fingerprint identifying units that are arranged in the direction OX and marked individually and sequentially with a2, a1, a and a3 as an example. In the line, the shielding traces of the fingerprint identifying units are not connected to each other, and therefore the shielding traces of the neighboring fingerprint identifying units have a gap therebetween. Accordingly, in the displaying units that are arranged in the direction OY, the third electrodes of the neighboring displaying units can pass through the gaps and are directly connected, and do not require to employ other complicated connection modes, which facilitates to simplify the designing.

Referring to FIG. 1, FIG. 1 illustrates by taking the case of one line of the displaying units that are arranged in the direction OX and marked individually and sequentially with b1, b and b2 as an example. In the line, the third electrodes of the displaying units are not connected to each other, and therefore the third electrodes of the neighboring displaying units have a gap therebetween. Accordingly, in each of the fingerprint identifying units that are arranged in the direction OX, the shielding traces of the neighboring fingerprint identifying units can pass through the gaps and are directly connected, and do not require to employ other complicated connection modes, which facilitates to simplify the designing.

Optionally, the fingerprint identifying unit further comprises a fourth electrode and an insulating layer. Referring to FIG. 2, the fourth electrode 22 is provided on one side of the first electrode that is further away from the substrate, and the orthographic projection EE3 of the fourth electrode 22 on the substrate 10 is located within the orthographic projection EE2 of the first opening on the substrate. The fourth electrode and the shielding trace are insulated from each other. The insulating layer 23 is located between the fourth electrode and the first electrode.

The meaning of the orthographic projection of the fourth opening on the substrate may refer to the above description, and is not discussed herein further. The position relation between the fourth electrode and the first electrode is not particularly limited herein. As an example, referring to FIG. 2, the orthographic projection EE3 of the fourth electrode on the substrate may be located within the orthographic projection EE2 of the first electrode on the substrate; or, the orthographic projection of the fourth electrode on the substrate and the orthographic projection of the first electrode on the substrate at least partially overlap; or, the orthographic projection of the first electrode on the substrate is located within the orthographic projection of the fourth electrode on the substrate.

In addition, the fourth electrode may also be provided on one side of the first electrode that is closer to the substrate. FIG. 2 illustrates by taking the case as an example in which the fourth electrode 22 is provided on one side of the first electrode 1 that is further away from the substrate 10. Such a structure can increase the utilization ratio of the first opening, and does not require to increase the thickness of the displaying base plate.

The fingerprint identifying unit comprises the first electrode and the fourth electrode, and is a mutual-capacitance-type fingerprint identification structure. The first electrode, the fourth electrode and the insulating layer may form a capacitor. Certainly, the fingerprint identifying unit may also comprise merely the first electrode, thereby forming a self-capacitance-type fingerprint identification structure. The principle of the mutual-capacitance-type fingerprint identification and the principle of the self-capacitance-type fingerprint identification may refer to the related art, and is not discussed herein further.

Optionally, referring to FIG. 2, the displaying base plate further comprises a packaging layer 21, the fingerprint identifying unit further comprises a first thin-film transistor, and the sub-pixel further comprises a second thin-film transistor;

the first thin-film transistor is located on one side of the first electrode that is closer to the substrate, and is electrically connected to the first electrode; the second thin-film transistor is located on one side of the second electrode that is closer to the substrate, and is electrically connected to the second electrode; and the packaging layer covers the third electrode, the shielding trace and the first electrode.

The packaging layer may comprise merely one layer, and may also comprise a plurality of layers, which is not limited herein. The types of the first thin-film transistor and the second thin-film transistor may be the same, and may also be different, and, in order to facilitate the fabrication, the former is usually selected. The first thin-film transistor and the second thin-film transistor may be both an oxide thin-film transistor, for example, an Indium Gallium Zinc Oxide (IGZO) thin-film transistor, an Indium Tin Zinc Oxide (ITZO) thin-film transistor and an Indium Zinc Oxide (IZO) thin-film transistor. Alternatively, they may also be both a Low Temperature Poly-silicon (LTPS) thin-film transistor.

Referring to FIG. 2, the first thin-film transistor comprises an active layer 111, a grid insulating layer 14, a grid 112, an inter-layer-medium layer 15 and a source-drain all of which are provided sequentially in stack on the substrate 10 (in FIG. 2 the source is marked with 114, and the drain is marked with 113). The structure of the second thin-film transistor is the same as the structure of the first thin-film transistor, and is not discussed herein further. In addition, in order to reduce the time quantities of the patterning and reduce the fabrication cost, the active layer 111 of the first thin-film transistor and the active layer 121 of the second thin-film transistor may be provided in the same one layer; the grid 112 of the first thin-film transistor and the grid 122 of the second thin-film transistor may be provided in the same one layer; and the source 114 and the drain 113 of the first thin-film transistor and the source 124 and the drain 123 of the second thin-film transistor may be provided in the same one layer.

The first thin-film transistor is used for supplying a driving voltage to the first electrode, to realize fingerprint identification. The second thin-film transistor is used for supplying a driving voltage to the second electrode, to realize the displaying.

Optionally, in order to protect the first thin-film transistor and the second thin-film transistor, the fingerprint identifying unit further comprises a first flat part, the first flat part covers the first thin-film transistor; and the first electrode is electrically connected to the first thin-film transistor by a via hole of the first flat part.

The sub-pixel further comprises a second flat part, the second flat part covers the second thin-film transistor; the second electrode is electrically connected to the second thin-film transistor by a via hole of the second flat part; and the first flat part and the second flat part are provided in a same one layer.

Certainly, referring to FIG. 2, the displaying base plate may further comprise a buffer layer 13, and the buffer layer is located between the active layer and the substrate.

In order to ensure the density of the fingerprint identifying units, to improve the effect of the fingerprint identification, and in order to alleviate the influence on the resolution of the displaying base plate to the largest extent, optionally, each of the displaying units may comprise three or four sub-pixels having different luminous colors.

As an example, the three sub-pixels having different luminous colors may include a red-color (R) sub-pixel, a green-color (G) sub-pixel and a blue-color (B) sub-pixel. In this case, one displaying unit forms one pixel. Referring to FIG. 1, the red-color sub-pixel may comprise one red-color light emitting unit 32, the green-color sub-pixel may comprise two green-color light emitting units 33, and the blue-color sub-pixel may comprise one blue-color light emitting unit 31. It should be noted that, because, currently, the luminous efficiencies of the blue-color luminescent material, the red-color luminescent material and the green-color luminescent material sequentially increases, in FIG. 1, the areas of the blue-color light emitting unit 31, the red-color light emitting unit 32 and the green-color light emitting units 33 sequentially decrease. The four sub-pixels having different luminous colors may include a red-color (R) sub-pixel, a green-color (G) sub-pixel, a blue-color (B) sub-pixel and a yellow-color (Y) sub-pixel. wherein Some of the displaying units may be of an RGB arrangement, and the other displaying units may be of a Diomand arrangement, which is not limited in the embodiments of the present disclosure.

An embodiment of the present disclosure further provides a displaying device, wherein the displaying device comprises the displaying base plate stated above.

The displaying device may be a rigid touch-controlling displaying device, and may also be a flexible touch-controlling displaying device (i.e., bendable and foldable), which is not limited herein. Moreover, it may be an Organic Light Emitting Diode (OLED) touch-controlling displaying device, and may also be a Micro LED touch-controlling displaying device or a Mini LED touch-controlling displaying device. The displaying device may be any products or components having the function of displaying, such as a television set, a digital camera, a mobile phone and a tablet personal computer.

The displaying device can realize full-screen fingerprint identification, and has the characteristics such as a high accuracy of fingerprint detection and an excellent displaying quality.

Figure 4:
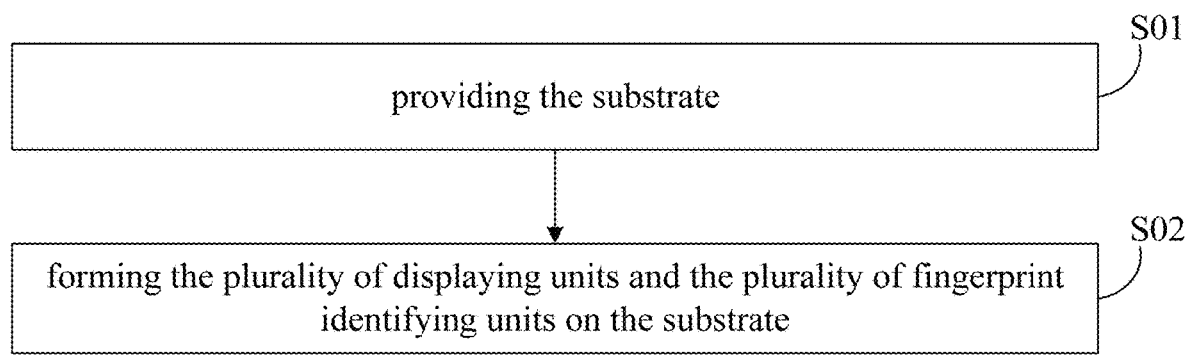
FIG. 4 is a flow chart of the fabricating method of the displaying base plate according to an embodiment of the present disclosure.

An embodiment of the present disclosure further provides a fabricating method of the displaying base plate stated in the above embodiments. As shown in FIG. 4, the method comprises:

S01: providing the substrate.

S02: forming the plurality of displaying units and the plurality of fingerprint identifying units on the substrate, wherein each of the displaying units comprises at least one sub-pixel; orthographic projections of the fingerprint identifying units on the substrate are separated from orthographic projections of the displaying units on the substrate; and each of the fingerprint identifying units comprises a first electrode and a shielding trace that are insulated from each other, an orthographic projection of the shielding trace on the substrate surrounds at least part of an orthographic projection of the first electrode on the substrate, and the shielding trace is electrically connected to an earthed end of the displaying base plate.

Figure 5:
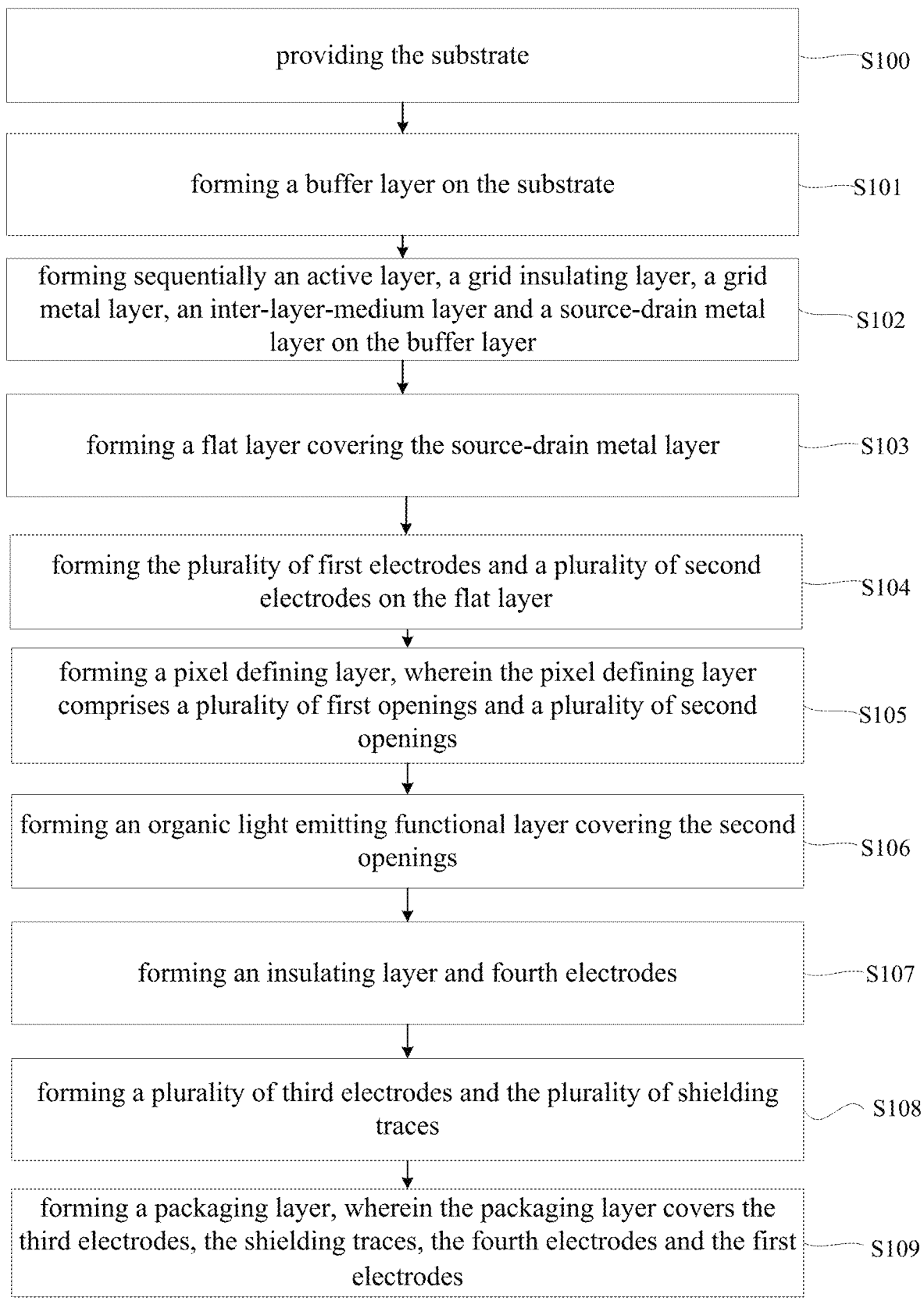
FIG. 5 is a flow chart of the fabricating method of the displaying base plate according to another embodiment of the present disclosure.

The fabricating method will be described particularly below by taking the structure of the displaying base plate shown in FIG. 2 as an example. As shown in FIG. 5, the fabricating method of the displaying base plate comprises:

S100: providing the substrate 10.

S101: forming the buffer layer 13 on the substrate 10.

S102: forming sequentially the active layer, the grid insulating layer 14, a grid metal layer, the inter-layer-medium layer 15 and the source-drain metal layer on the buffer layer 13, to form a plurality of first thin-film transistors and a plurality of second thin-film transistors, wherein the grid metal layer comprises a plurality of grids, and the source-drain metal layer comprises a plurality of sources and a plurality of drains.

S103: forming a flat layer 16 covering the source-drain metal layer, wherein the flat layer comprises a plurality of first flat parts and a plurality of second flat parts.

S104: forming the plurality of first electrodes 1 and the plurality of second electrodes 17 on the flat layer, wherein the first electrode 1 is electrically connected to the drain 113 of the first thin-film transistor by a via hole penetrating the first flat part, and the second electrode 17 is electrically connected to the drain 123 of the second thin-film transistor by a via hole penetrating the second flat part, wherein the first electrode may be used as the anode.

S105: forming the pixel defining layer 18, wherein the pixel defining layer comprises a plurality of first openings and a plurality of second openings, the first electrode 1 is located within one of the first openings, the orthographic projection EE1 of the first electrode 1 on the substrate is located within the orthographic projection EE2 of the first opening on the substrate, and the orthographic projection FF1 of the second opening on the substrate is located within the orthographic projection FF2 of the second electrode on the substrate.

Here, the dimension of the first opening in the pixel defining layer may be greater than the size of the first electrode by 1-3 μm.

S106: forming the organic light emitting functional layer 19 covering the second opening.

S107: forming the insulating layer 23 and the fourth electrode 22, wherein the fourth electrode 22 is provided on one side of the first electrode that is further away from the substrate, and the orthographic projection EE3 of the fourth electrode 22 on the substrate 10 is located within the orthographic projection EE2 of the first opening on the substrate; and the insulating layer 23 is located between the fourth electrode and the first electrode.

S108: forming a plurality of third electrodes 20 and a plurality of shielding traces 2, wherein the third electrode covers the second opening, and an orthographic projection of the shielding trace on the substrate surrounds at least part of an orthographic projection of the first electrode on the substrate, and is electrically connected to an earthed end of the displaying base plate. Here, the third electrode may be used as the cathode. The shielding trace is not connected to the first electrode and the fourth electrode.

Particularly, an electrically conductive thin film may be formed firstly, and then the electrically conductive thin film is patterned by using a Fine Metal Mask (FMM) or a common mask, thereby obtaining the third electrodes and the shielding traces. Accordingly, the third electrodes and the shielding traces are fabricated by using the one-step patterning process, which can effectively reduce the time quantities of the patterning process and reduce the fabrication cost.

S109: forming the packaging layer 21, wherein the packaging layer 21 covers the third electrodes 20, the shielding traces 2, the fourth electrodes 22 and the first electrodes 1, to serve for protection and insulation.

In the displaying base plate formed by using the above method, in an aspect, the fingerprint identifying units and the displaying units are integrated together, which can realize full-screen fingerprint identification. In another aspect, the shielding trace of the fingerprint identifying unit surrounds at least part of the first electrode, and is electrically connected to an earthed end of the displaying base plate. Therefore, the shielding traces can draw out the interference signal between the first electrodes in the neighboring fingerprint identifying units, which effectively reduces the mutual-capacitance interference between the first electrodes in the neighboring fingerprint identifying units, and in turn increases the accuracy of the fingerprint detection. Moreover, the displaying units and the fingerprint identifying units can be shielded, which alleviates the problem of the signal interference between the displaying units and the fingerprint identifying units, to further improve the displaying quality. The fabricating method is simple and easy to implement, and has a good operability.

The above are merely particular embodiments of the present disclosure, and the protection scope of the present disclosure is not limited thereto. All of the variations or substitutions that a person skilled in the art can easily envisage within the technical scope disclosed by the present disclosure should fall within the protection scope of the present disclosure. Therefore, the protection scope of the present disclosure should be subject to the protection scope of the claims.

The invention claimed is:

1. A displaying base plate, wherein the displaying base plate comprises:
   a substrate;
   a plurality of displaying units, wherein the plurality of displaying units are located on the substrate, and each of the displaying units comprises at least one sub-pixel;
   a plurality of fingerprint identifying units, wherein the plurality of fingerprint identifying units are located on the substrate, and orthographic projections of the fingerprint identifying units on the substrate are separated from orthographic projections of the displaying units on the substrate; and each of the fingerprint identifying units comprises a first electrode and a shielding trace that are insulated from each other, an orthographic projection of the shielding trace on the substrate surrounds at least part of an orthographic projection of the first electrode on the substrate, and the shielding trace is electrically connected to an earthed end of the displaying base plate;

wherein the displaying base plate further comprises a pixel defining layer located on the substrate, and the pixel defining layer comprises a plurality of first openings and a plurality of second openings; and in each of the fingerprint identifying units, the first electrode is located within one of the first openings, an orthographic projection of the first electrode on the substrate is located within an orthographic projection of the first opening on the substrate, the shielding trace is located on one side of the pixel defining layer that is further away from the substrate, and the first electrode and the shielding trace are not connected to each other.

2. The displaying base plate according to claim 1, wherein the shielding trace covers at least part of a side wall of the first opening, and the shielding trace covers at least a surface of the pixel defining layer that is further away from the substrate.

3. The displaying base plate according to claim 1, wherein the sub-pixel comprises a second electrode, the second electrode is located on one side of the pixel defining layer that is closer to the substrate, and an orthographic projection of the second opening on the substrate is located within an orthographic projection of the second electrode on the substrate; and the first electrode and the second electrode are provided in a same one layer.

4. The displaying base plate according to claim 1, wherein a distance between the first electrode and a side wall of the first opening ranges from approximately 1 μm to approximately 3 μm.

5. The displaying base plate according to claim 2, wherein the sub-pixel further comprises a third electrode, and the third electrode is located on one side of the pixel defining layer that is further away from the substrate, and covers the second opening; and the shielding trace and the third electrode are provided in a same one layer, and are insulated from each other.

6. The displaying base plate according to claim 5, wherein the shielding trace and an anode are provided in a same one layer.

7. The displaying base plate according to claim 5, wherein the third electrode is an anode, and the second electrode is a cathode; or, the third electrode is a cathode, and the second electrode is an anode.

8. The displaying base plate according to claim 5, wherein the sub-pixel further comprises an organic light emitting functional layer, and the second electrode, the third electrode and the organic light emitting functional layer form a light emitting unit.

9. The displaying base plate according to claim 5, wherein the displaying units and the fingerprint identifying units are arranged in a stagger form in a first direction and a second direction, wherein the first direction and the second direction intersect perpendicularly; and all of the shielding traces of the fingerprint identifying units that are arranged in a first diagonal-line direction are connected to each other, and all of the third electrodes of the displaying units that are arranged in the first diagonal-line direction are connected to each other, wherein the first diagonal-line direction and the first direction intersect non-perpendicularly.

10. The displaying base plate according to claim 9, wherein the shielding traces of the fingerprint identifying units that are arranged in a second diagonal-line direction are not connected to each other, and the third electrodes of the displaying units that are arranged in the second diagonal-line direction are not connected to each other, wherein the second diagonal-line direction intersects with the first diagonal-line direction, and non-perpendicularly intersects with the first direction.

11. The displaying base plate according to claim 5, wherein the fingerprint identifying unit further comprises a fourth electrode and an insulating layer; and the fourth electrode is provided on one side of the first electrode that is further away from the substrate, an orthographic projection of the fourth electrode on the substrate is located within an orthographic projection of the first opening on the substrate, the fourth electrode and the shielding trace are insulated from each other, and the insulating layer is located between the fourth electrode and the first electrode.

12. The displaying base plate according to claim 5, wherein the displaying base plate further comprises a packaging layer, the fingerprint identifying unit further comprises a first thin-film transistor, and the sub-pixel further comprises a second thin-film transistor; and the first thin-film transistor is located on one side of the first electrode that is closer to the substrate, and is electrically connected to the first electrode, the second thin-film transistor is located on one side of the second electrode that is closer to the substrate, and is electrically connected to the second electrode, and the packaging layer covers the third electrode, the shielding trace and the first electrode.

13. The displaying base plate according to claim 12, wherein each of the first thin-film transistor and the second thin-film transistor comprises an active layer, a grid insulating layer, a grid, an inter-layer-medium layer, a source and a drain all of which are provided sequentially in stack on the substrate, and the displaying base plate further comprises a buffer layer;

the active layer of the first thin-film transistor and the active layer of the second thin-film transistor are provided in a same one layer, the grid of the first thin-film transistor and the grid of the second thin-film transistor are provided in a same one layer, and the source and the drain of the first thin-film transistor and the source and the drain of the second thin-film transistor are provided in a same one layer; and the buffer layer is located between the active layer and the substrate.

14. The displaying base plate according to claim 12, wherein the fingerprint identifying unit further comprises a first flat part, the first flat part covers the first thin-film transistor, and the first electrode is electrically connected to the first thin-film transistor by a via hole of the first flat part.

15. The displaying base plate according to claim 14, wherein the sub-pixel further comprises a second flat part, the second flat part covers the second thin-film transistor, and the second electrode is electrically connected to the second thin-film transistor by a via hole of the second flat part; and the first flat part and the second flat part are provided in a same one layer.

16. The displaying base plate according to claim 1, wherein each of the displaying units comprises three or four sub-pixels having different luminous colors.

17. A displaying device, wherein the displaying device comprises the displaying base plate according to claim 1.

18. A fabricating method of the displaying base plate according to claim 1, wherein the method comprises:
    providing the substrate; and
    forming the plurality of displaying units and the plurality of fingerprint identifying units on the substrate.

19. The fabricating method of the displaying base plate according to claim 18, wherein after the step of providing the substrate, the method further comprises:
    forming a buffer layer on the substrate; and
    the step of forming the plurality of displaying units and the plurality of fingerprint identifying units on the substrate comprises:
    forming sequentially an active layer, a grid insulating layer, a grid metal layer, an inter-layer-medium layer and a source-drain metal layer on the buffer layer, to form a plurality of first thin-film transistors and a plurality of second thin-film transistors, wherein the grid metal layer comprises a plurality of grids, and the source-drain metal layer comprises a plurality of sources and a plurality of drains;
    forming a flat layer covering the source-drain metal layer, wherein the flat layer comprises a plurality of first flat parts and a plurality of second flat parts;
    forming the plurality of first electrodes and a plurality of second electrodes on the flat layer, wherein the first electrodes are electrically connected to the sources of the first thin-film transistors by via holes penetrating the first flat parts, and the second electrodes are electrically connected to the sources of the second thin-film transistors by via holes penetrating the second flat parts;
    forming a pixel defining layer, wherein the pixel defining layer comprises a plurality of first openings and a plurality of second openings;
    forming an organic light emitting functional layer covering the second openings;
    forming an insulating layer and fourth electrodes;
    forming a plurality of third electrodes and the plurality of shielding traces; and
    forming a packaging layer, wherein the packaging layer covers the third electrodes, the shielding traces, the fourth electrodes and the first electrodes.

\* \* \* \* \*